July 5, 1955     J. B. GARRISON ET AL     2,712,613
ELECTRONIC TUBE
Filed March 4, 1946     2 Sheets-Sheet 1

*INVENTORS*
JOHN B. GARRISON
GEORGE H. VINEYARD
BY
ATTORNEY

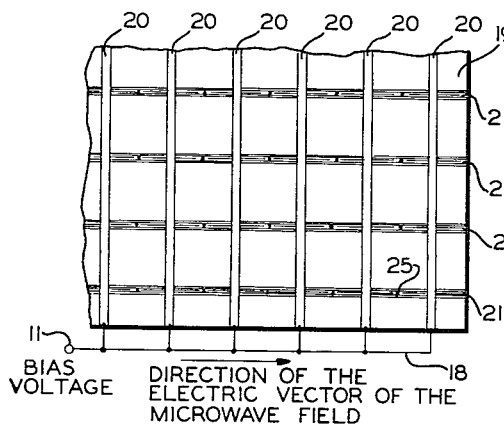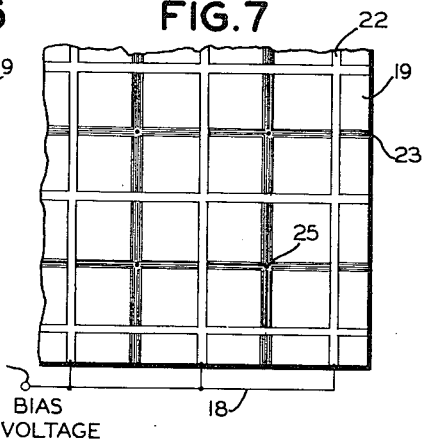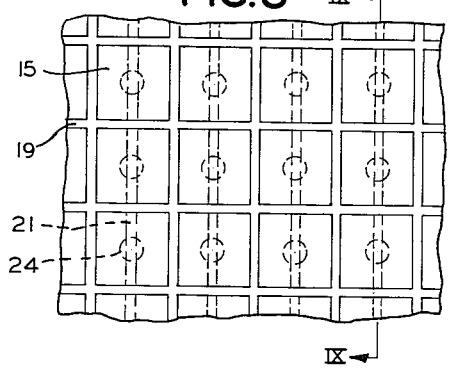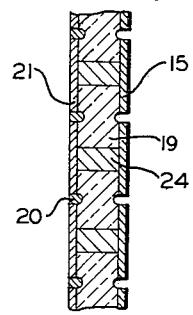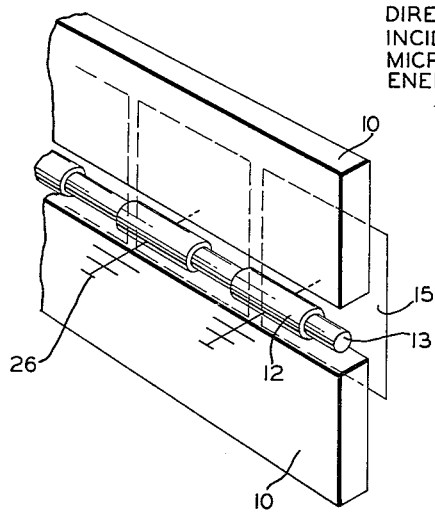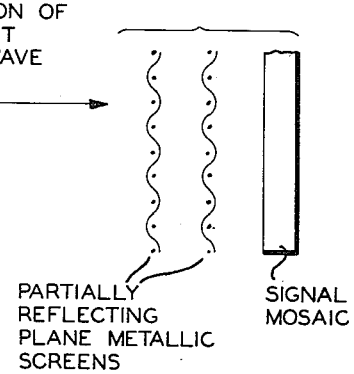

United States Patent Office 2,712,613
Patented July 5, 1955

2,712,613

ELECTRONIC TUBE

John B. Garrison, Cambridge, and George H. Vineyard, Boston, Mass., assignors, by mesne assignments, to the United States of America as represented by the Secretary of the Navy Application March 4, 1946, Serial No. 651,873

11 Claims. (Cl. 315—1)

This invention relates to radiovision apparatus and in particular to signal mosaics used in radiovision pickup tubes.

In radiovision an object is illuminated by electromagnetic microwaves from a transmitter. The microwave energy reflected by the object is focussed by a microwave lens system, such as a metal paraboloid, into a microwave image, just as the light rays reflected by an illuminated object are focussed into an optical image by a camera lens. The microwave image at the focus of the microwave lens system is examined by positioning a radiovision pickup tube so that the microwave image falls upon the signal mosaic of the tube. This radiovision pickup tube is in principle similar to the iconoscope and orthiconoscope television transmitting tubes, well known to those versed in the art. The signal mosaic of the radiovision pickup tube is so contrived that a microwave electromagnetic field inpinging upon it causes electric charges and potential differences to accumulate upon it, and the density of charge and amount of potential developed at any point on the signal mosaic depends upon the amplitude of the microwave field prevailing at that point. This illuminated region of the signal mosaic is scanned by an electron beam, and the electron beam is so arranged that the amount of current flowing to some electrode in the tube as a result of the presence of the electron beam depends upon the amount of charge and/or potential accumulated on the signal mosaic at the point where the electron beam is impinging. The electron beam is made to scan rapidly over the surfaces of the signal mosaic, and the current to some electrode in the tube fluctuates in a manner depending upon the intensity of the microwave field at the various points being scanned. This varying current is amplified and used to modulate the intensity of another electron beam in a cathode ray oscilloscope, which beam is being caused to scan the oscilloscope screen in synchronism with the beam in the pickup tube. Thus on the screen of the oscilloscope a direct visible reproduction of the microwave field amplitude pattern is obtained, and at a high enough rate to reproduce fluctuations in the microwave field much faster than the eye can follow.

Signal mosaics consist of a number of identical units arranged on a plate or piece of backing material. The microwave field in the vicinity of any unit causes a current to be excited in that unit and to flow through some kind of rectifying device. The rectifying device automatically causes a charge to accumulate on some portion of the unit and an accompanying potential difference to develop between different portions of the unit. The units are further arranged so that this accumulation of charge will affect the electron beam when it scans over the unit, and change the current to some electrode in the tube. This interaction of scanning beam and charged element of the signal mosaic is very similar to that in tubes used for television transmitters (iconoscope and orthiconoscope tubes, and variations based upon them).

It is an object of this invention to provide new and improved types of signal mosaics for use in a radiovision pickup tube.

Other and further objects of this invention will be apparent from the following specifications when taken with the accompanying drawings in which:

Fig. 5 is a front view of a portion of a third type of signal mosaic;

Fig. 6 is an end view of the signal mosaic of Fig. 5;

Fig. 7 is a front view of a portion of a variation of the signal mosaic of Fig. 5;

Fig. 8 is a rear view of a portion of a variation of the signal mosaics of Fig. 5 and Fig. 7;

Fig. 9 is a section view of a part of Fig. 8;

Fig. 10 is a perspective view of Fig. 1 with additional elements; and

Fig. 11 is a side view of a signal mosaic with other elements added.

Figure 1:
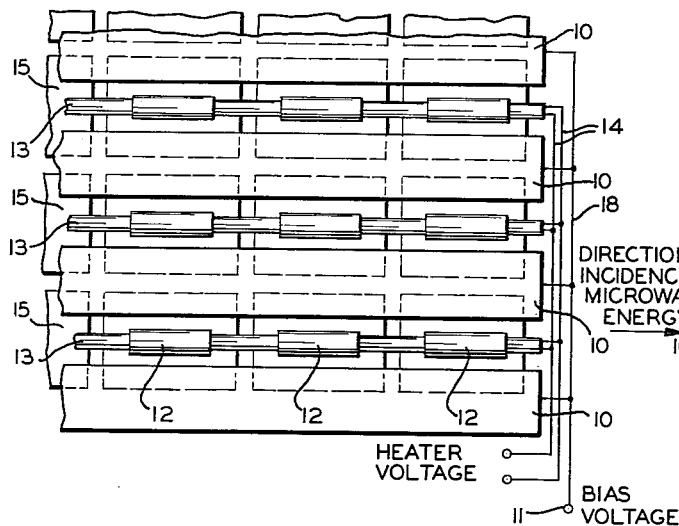
Fig. 1 is a front view of a portion of one type of signal mosaic.

The figures, to be discussed below, illustrate in detail, segments of radiovision signal mosaics. For clarity, the remainder of the radiovision tube structure has been omitted. It will be understood that the complete signal mosaic is suitably mounted within an evacuated envelope along with the necessary electrodes for producing an electron beam and for detecting the fluctuations in signal current released by the presence of the electron beam. The electron beam in operation is caused to scan the mosaic by deflection means not shown. Throughout the figures similar elements have been designated by the same reference numerals.

Figure 2:
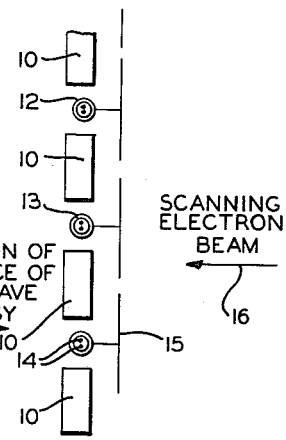
Fig. 2 is an end view of the signal mosaic of Fig. 1.

In the embodiment of the invention as shown in Figs. 1 and 2, the rectifying elements of the signal mosaic are thermionic diodes. The anodes 10 are made of conducting material and are connected together by conductor 18 and held at the desired potential with respect to the cathode of an electron gun (not shown) by means of the bias voltage applied at terminal 11. The cathodes 12 in the signal mosaic are supported by rods 13 of insulating material and are indirectly heated, preferably by heater wires 14 which extend inside the cathode supports. Behind each cathode 12 is a metal charging plate 15, electrically connected to it. These charging plates are scanned by an electron beam, schematically indicated by arrow 16, generated by the aforementioned electron gun. When microwave energy is incident upon any element of the mosaic, electrons will be urged from cathode 12 of that element to surrounding anodes 10, but no electrons can return. Thus, a positive charge is accumulated on cathode 12 and on charging plate 15 connected to it, and this results in a potential difference between charging plates 15 and anode 10, which influences electron beam 16 when it scans over the charged plates. The elements of this signal mosaic may also be arranged so that the cathodes are all electrically connected together and the anodes are individual and isolated and connected to the charging plates. In this case a negative charge will collect on the charging plates and influence the electron beam.

Figure 3:
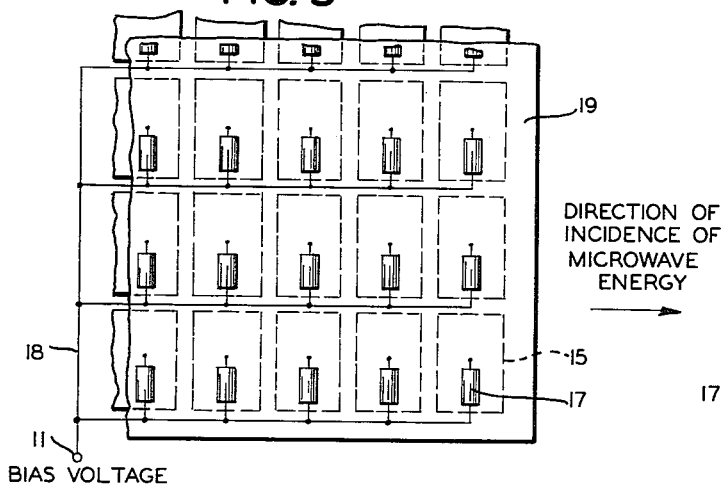
Fig. 3 is a front view of a portion of another type of signal mosaic.
Figure 4:
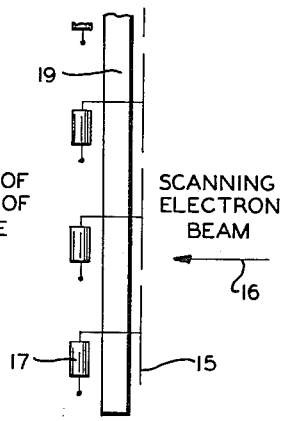
Fig. 4 is an end view of the signal mosaic of Fig. 3.

In the embodiment of the invention as shown in Figs. 3 and 4, the rectifying elements of the signal mosaic are individual rectifying units 17 similar to the well known microwave cartridge type crystal rectifiers, for example, the type described and illustrated on page 4–59 of "Principles of Radar," by the Staff of the M. I. T. Radar School, Technology Press, Massachusetts Institute of Technology, Cambridge, Massachusetts, 1944. These units are mounted on and supported by dielectric plate 19. One end of each cartridge crystal 17 is connected to conductor 18 which allows the proper biasing voltage, at terminal 11, to be applied between the rectifying elements and the cathode of the electron gun. The other end of each cartridge crystal 17 is connected to charging plate 15 which is scanned by electron beam, arrow 16. The operation of this signal mosaic is then the same as that described for the signal mosaic of Fig. 1.

Still another embodiment of this invention is shown in the remaining figures. The rectifying action of the units which comprise the signal mosaic occurs at the interfaces between lines of conducting material and lines of semi-conducting material which are arranged in a network on the surface of a dielectric plate. This network may be of any geometric configuration, as for example, the rectangular mesh of a type as shown in Fig. 5 or Fig. 7. The mosaic network as shown in Fig. 5 is composed of lines of conducting (or semi-conducting) material 20 which are all connected together by conductor 18 and connected to the bias voltage at terminal 11, and lines of semi-conducting (or conducting) material 21 placed at right angles to lines 20. The one set of lines 20 are continuous while the other set of lines 21 are broken and only just make contact with the continuous lines. With this arrangement the microwave field will cause the broken lines to accumulate charges and potential differences, which can be detected by a scanning beam of electrons. In the network as shown in Fig. 7, the lines of conducting (or semi-conducting) material 22 are in the form of a screen and the lines of semi-conducting (or conducting) material 23 are in the form of crosses just making contact with lines 22 at the intersections. In this arrangement the microwave field will cause the crosses to accumulate charges and potential differences which can be detected by the scanning beam of electrons. The signal mosaic of Fig. 5 is polarized in that the sensitivity of the mosaic depends upon the polarization of the microwave field, having maximum sensitivity when the electric vector of the electromagnetic energy is parallel to broken lines 21, and having minimum sensitivity when the electric vector is parallel to the solid lines 20. The signal mosaic of Fig. 7 is not polarized in that the sensitivity of the mosaic is approximately constant regardless of the polarization of the incident electromagnetic energy.

The scanning of the signal mosaics of Figs. 5 and 7 may be arranged in various ways. The scanning beam of electrons may be incident on the face of the mosaic and detect the charges directly from the broken lines, or the broken lines may be connected to charging plates of various sizes and shapes and the scanning beam may then be incident from either side of the mosaic, depending upon where the charging plates are located. One arrangement of charging plates is shown in Figs. 8 and 9. In this arrangement the charging plates 15 are preferably square plates mounted on one side of dielectric support 19 and connected to broken lines 21 by means of conductors 24 running through support plate 19. Fig. 9 is a section through IX—IX or Fig. 8 showing the arrangement in detail.

The signal mosaic as shown in Figs. 5 and 6 is constructed as follows: One face of dielectric plate 19, after being made sufficiently flat, is scribed with a set of parallel grooves. If the plate is of glass, the scribing may be done by scratching with a diamond or by etching with acid, if the plate is of other dielectric material the scribing may be done by whatever means will make fine, clean-cut grooves. The plate is then cleaned and the grooved face is covered with a very thin layer of the material which is desired for broken lines 21 in the finished network. The layer is best applied by vacuum evaporation or cathode sputtering techniques. The coated face of plate 19 is then ground against a very fine abrasive surface which is accurately flat. This removes all the coating except that which is in the grooves, leaving a series of fine parallel lines of material. The plate is now scribed again with a set of parallel grooves at right angles to the first set and deep enough to break the continuity of the first set of lines of material at the intersections. The face of the plate is then covered with a layer of the material which is desired for continuous lines 20 in the finished network. The plate is again ground so that only the desired network of lines remains, and the mosaic is complete except for electrical connections and mounting. The network of lines as shown in Fig. 7 can be made in the same manner merely by scribing the desired lines in the proper order.

Charging plates may be added to either signal mosaic Fig. 5 or Fig. 7 by the following method. After the first set of lines are scribed; but before any material is deposited on the plate, holes are drilled through the plate so that they will be at positions 25 (Figs. 5 and 7) in the finished mosaic. These holes are filled with a conducting material, thus forming conductors through the plate, as conductors 24, Figs. 8 and 9. The mosaic is then completed as explained above. The back of support plate 19 is then coated with the material which is to form the charging plates. The back of plate 19 is then grooved to a sufficient depth to penetrate the coating of material, the grooves being placed in such a way that the remaining material is left in isolated squares, as 15, Figs. 8 and 9, each square positioned over one conducting plug 24. This then connects each broken line of the signal mosaic to a charging plate on the opposite side of the supporting dielectric.

The materials of which the lines of the mosaic are composed can be any combination of conducting material and semi-conducting material which show rectifying properties at the junction of the two materials; as for example, silver and silicon, or silver and germanium. The dielectric mounting plate can be of any insulating material such as glass, mica, plastic, etc. The charging plates can be of any material, but preferably that which will emit secondary electrons when scanned by the electron beam of the tube.

In order to utilize the maximum amount of microwave energy available, a means for matching the impedance of the signal mosaic to the impedance of free space must be employed. This may be done by designing the individual elements of the mosaic to resonate properly at the frequencies of interest. The size, shape, and arrangement of the elements all contribute to the resonance. The resistance of the rectifying contacts and the resistivity and dielectric constant of the materials comprising the mosaic may all be varied suitably. The charging plates may be shaped and arranged so as to aid the match and various additional tuning antennas may be added to the elements of the mosaic such as shown at 26 in Fig. 10. If two partially reflecting plain metallic screens are placed in front of the mosaic at the proper distance, it may be readily shown that such screens, providing they are of sufficiently high reflectance, are capable of matching a mosaic of any impedance to free space for at least one frequency. Such screens are shown in Fig. 11.

In most manners of application, the sensitivity of the signal mosaic may be increased by the addition of extra capacitance between each charging plate and the bias line. This capacity will allow the charge on each element to accumulate during all of the period while the element is not being scanned, thus making a larger amount of energy available for release by the scanning beam.

It is not intended that this invention be limited to the details as set forth in the specifications, but is to be limited only by the following claims.

What is claimed is:

1. An electron tube for indicating the strength and distribution of energy in an incident electromagnetic field comprising, a plurality of spaced rectifying elements supported in a plane and disposed for uniform exposure to said field, means for matching the impedance of said elements to the impedance of free space at a predetermined frequency, means for applying a biasing potential to each of said elements by means of a common conductor, a plurality of storage capacitors each formed by an insulated metallic plate spaced from said rectifier elements and said common conductor, means for mounting said plates in a plane parallel to the plane of said rectifying element, means connecting each rectifier element to a separate storage capacitor, means for scanning the insulated plates of said storage capacitor with an electron beam, and means for indicating fluctuations in the current of said beam caused by incidence of said beam on said plates.

2. Apparatus as in claim 1 wherein said impedance matching means comprises a plurality of partially reflecting metallic screens disposed between said signal mosaic and the incident electromagnetic energy.

3. In an electron discharge tube having electrodes for producing an electron beam and means for detecting fluctuations in signal current released by the presence of said beam, a signal mosaic comprising a plurality of spaced rectifier elements, means for supporting said elements in a plane, means for biasing said elements with respect to said beam, said biasing means including a common conductor connected to one electrode of each rectifier element, a plurality of storage capacitors each formed by a metallic plate insulated and spaced from said rectifier elements and said common conductor, means connecting the second electrode of each rectifier element to a separate isolated metallic plate thereby to charge said capacitors in accordance with the strength and distribution of microwave energy incident to said mosaic, and means for scanning said metallic plates with said electron beam to produce fluctuations in signal current in accordance with the charge accumulated by said storage capacitors.

4. In combination with claim 3 a plurality of tuning elements each associated with one of said units which comprise said signal mosaic, said tuning elements being arranged to match the impedance of said rectifier elements to the impedance of free space for a predetermined frequency.

5. In combination with claim 3 a plurality of partially reflecting metallic screens placed between said signal mosaic and incident electromagnetic energy to match the impedance of said signal mosaic to the impedance of free space for a predetermined frequency.

6. In an electron discharge tube having electrodes for producing an electron beam and means for detecting fluctuations in signal current released by the presence of said beam, a signal mosaic comprising, a plurality of thermionic diodes spaced in a geometric network in a common plane, each having an electron emissive indirectly heating cathode supported by an insulating member and an anode connected to a common conductor, means for biasing said anodes with respect to said beam, a plurality of storage capacitors each formed by a metallic plate insulated and spaced from said diodes and said common conductor in a plane parallel to the plane of said diodes, means connecting the cathode of each diode to a separate metallic plate thereby to charge said capacitors in accordance with the strength and distribution of microwave energy incident to said mosaic, and means for scanning said metallic plates with said electron beam to produce fluctuations in said signal current in accordance with the charge accumulated by said storage capacitors.

7. In combination with claim 6 a plurality of partially reflecting metallic screens placed between said signal mosaic and incident electromagnetic energy to match the impedance of said signal mosaic to the impedance of free space for a predetermined frequency.

8. In an electron discharge tube having electrodes for producing an electron beam and means for detecting fluctuations in signal current released by the presence of the beam, a signal mosaic having a plurality of rectifiers, said signal mosaic comprising a network of lines of semiconductive material and lines of conductive material mounted on a dielectric plate, the lines of one material being electrically interconnected to form a common conductor, the lines of said other material being formed by discrete segments, said segments being in rectifying contact with said common conductor, a plurality of storage capacitors each formed by a metallic plate insulated and spaced from said rectifiers, means electrically connecting each of said segments to a different plate, and means for scanning said storage capacitors with said electron beam to produce fluctuations in signal current in accordance with the accumulated charge.

9. In an electron discharge tube containing the structure described in claim 8, the improvement comprising tuning means arranged to match the impedance of said rectifiers to the impedance of free space for a predetermined frequency range.

10. In an electron tube having means for producing an electron beam, a signal mosaic comprising a plurality of rectifiers supported in a plane for exposure to an electromagnetic field, each of said rectifiers having one electrode connected to a common conductor, a plurality of storage plates spaced from said rectifiers and arranged to be scanned by said electron beam, and means connecting each of the other electrodes of said rectifiers to a different one of said storage plates.

11. In the invention as set forth in claim 10, said plurality of rectifiers supported in a plane comprising crystal type microwave rectifiers arranged on a supporting dielectric base.

References Cited in the file of this patent

UNITED STATES PATENTS

| | | |
|---|---|---|
| 2,083,292 | Cawley | June 8, 1937 |
| 2,419,024 | Iams | Apr. 15, 1947 |
| 2,429,933 | Gibson | Oct. 28, 1947 |
| 2,453,502 | Dimmick | Nov. 9, 1948 |
| 2,571,163 | Rines | Oct. 16, 1951 |

FOREIGN PATENTS

| | | |
|---|---|---|
| 541,959 | Great Britain | Dec. 19, 1941 |